Dec. 5, 1967          H. R. SOBECK          3,355,864
DUST AND LIKE PARTICLE SEPARATOR
Filed Sept. 11, 1964          2 Sheets-Sheet 1
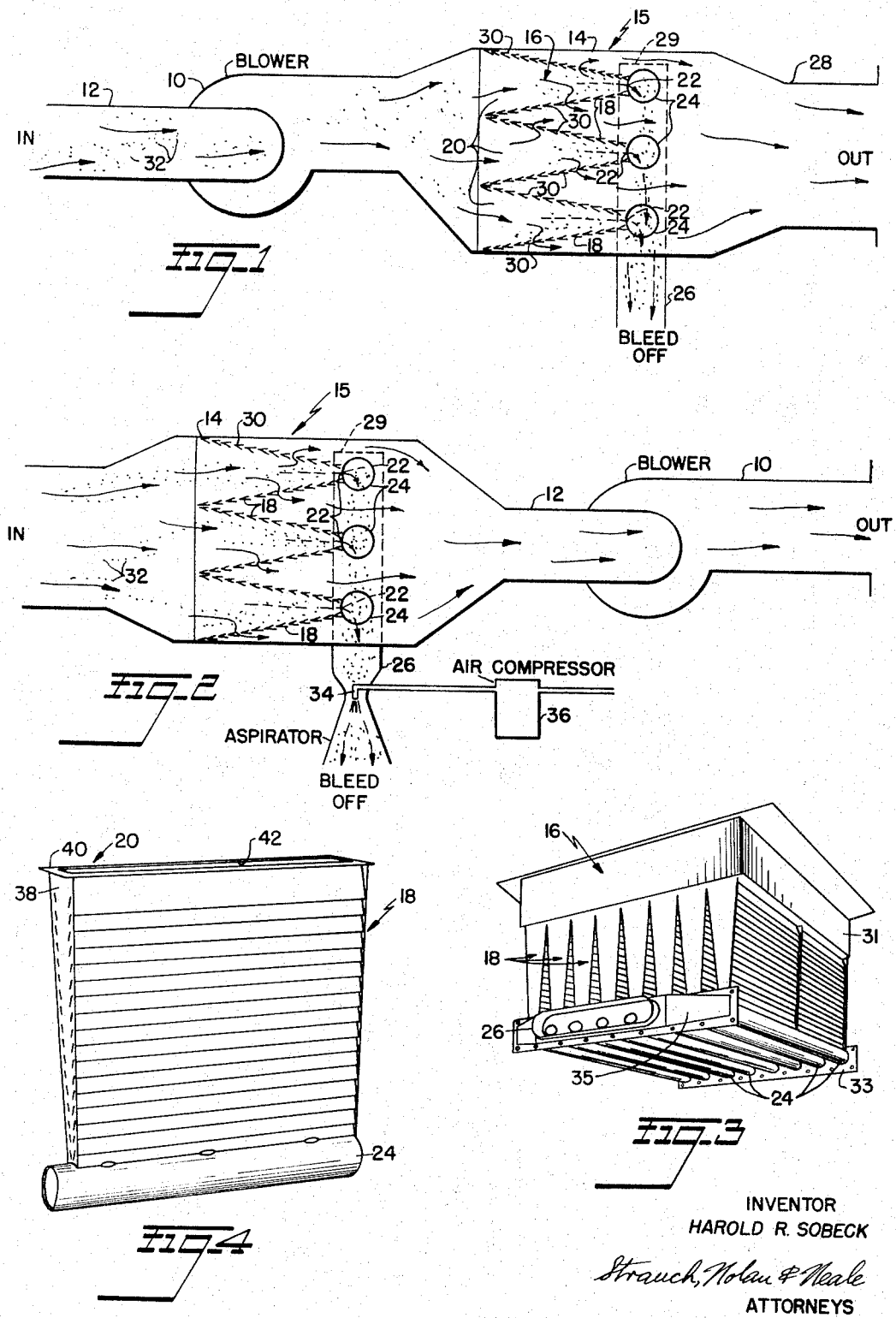
INVENTOR
HAROLD R. SOBECK
ATTORNEYS

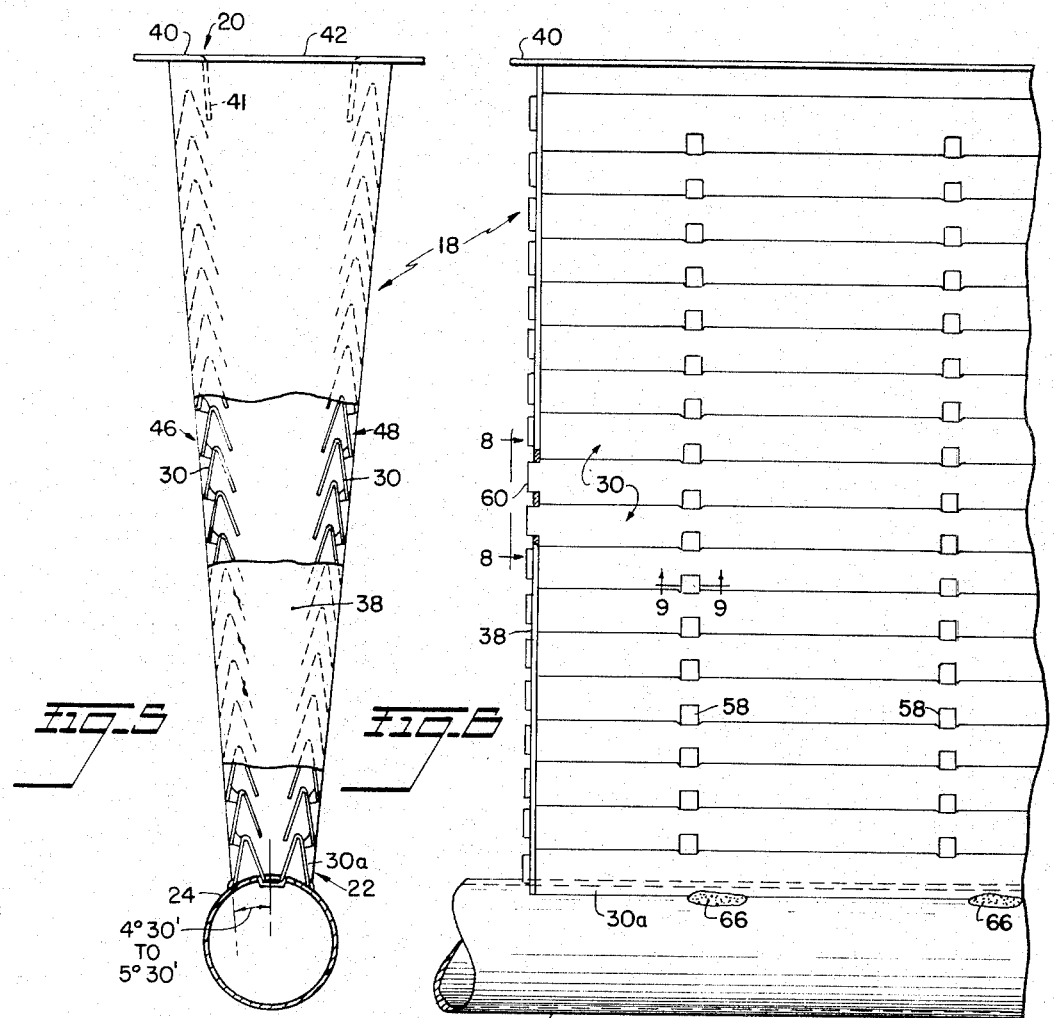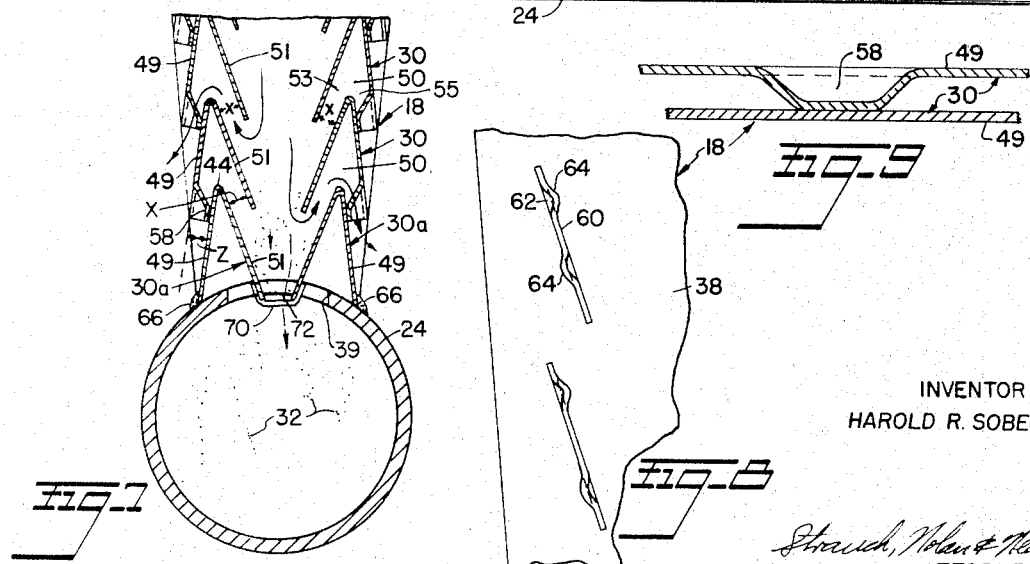

United States Patent Office 3,355,864
Patented Dec. 5, 1967

3,355,864
DUST AND LIKE PARTICLE SEPARATOR
Harold R. Sobeck, Novelty, Ohio, assignor to Rockwell-Standard Corporation, Pittsburgh, Pa., a corporation of Delaware
Filed Sept. 11, 1964, Ser. No. 395,671
9 Claims. (Cl. 55—443)

ABSTRACT OF THE DISCLOSURE

An apparatus for separating dust and other solid particles from gas passing through converging banks of inverted V-shaped baffles. A conduit perpendicularly positioned to the flow of particles is disposed across the smaller open end of each bank of baffles to collect and discharge the particles into an exhaust manifold.

---

The present invention refers to air or gas cleaning apparatus and more specifically to an air or other gas dust separator in which the majority of the dust and like particles are separated from the stream of air or gas mainly by their own inertia.

In this type of dust separator an incoming stream of air or gas containing solid particles of dust or other particulate material to be separated therefrom is caused to change its direction of flow to follow passages through which the air or gas is forced under pressure. The large majority of the particles resist following any change in direction of the stream and tend to continue along the initial direction of the incoming air or gas and are carried by a relatively small amount of bleed air or gas away from the cleaned air outlets to a dirt collecting receptacle or discharged back into the atmosphere.

This type of dust separator is widely used as precleaners in power plants, industrial buildings, diesel locomotives and like installations wherein large air volumes are required as for engine combustion, generator and motor cooling and the like.

The effectiveness of these dust separators depends largely on the proper design of the passages and related openings by which the air is caused to change its direction within the apparatus. The efficiency of these separators in removing particles depends on the amount of air flow usually measured in cubic feet per minute and the amount and grain size of dust particles carried by the air, and is usually from 75% to 90%. Because of the basic operational characteristics of these separators, the coarser the dust particles the higher is the efficiency due to their larger inertial mass. Efficiency is influenced further by the percentage of bleed air relative to the total air flow, and bleed air is preferably about 10% of the total air flow. This type of dust separator is often used in series with a more complex filter assembly for further removing smaller dust particles.

It is the major object of this invention to provide a novel dust or like particle separator assembly having special separator cell structure for improved extraction of said particles.

Another object of the invention is to provide a novel air deflecting separator cell for dust separators of this type which cell has a wall structure that consists essentially of a number of inverted V-shaped baffles nested within each other with their closed ends turned to the air intake side and their open ends towards the air outlet side and so located that the major part of a stream of air or gas entering the separator cell will be deviated from its initial course.

A further object of the present invention resides in the provision of a novel dust separator cell having baffles of inverted V-shape the vanes of which are positioned at an angle and so arranged that when the baffles are nested within each other in passage forming relation the space between adjacent baffles at one side is larger than at the other side.

Other novel features and ancillary objects reside in the novel fastening and spacing means of the baffles for a separator cell.

Further objects of the invention will appear from the following detailed description and claims in connection with the appended drawings wherein:

FIGURE 1 is a diagrammatic view illustrating one application of the invention wherein the dust separator is disposed at a blower outlet;

FIGURE 2 diagrammatically illustrates another application of the invention wherein the dust separator is disposed at a blower inlet;

FIGURE 3 is a perspective view of a complete separator unit composed of several individual cells of the type shown in FIGURE 4;

FIGURE 4 is a perspective view showing one cell of the novel dust separator of the invention;

FIGURE 5 is an enlarged side view partially in section showing the novel separator cell of FIGURE 4 with parts of the side panel broken away to show the interior;

FIGURE 6 is a front view of the cell of FIGURE 5;

FIGURE 7 is a further enlarged fragmentary view showing the lower section of the cell of FIGURE 5 more clearly illustrating the relative positions of the baffles and the attachment of the lowermost baffles to the bleed-off tube;

FIGURE 8 is an enlarged fragmentary view partly in section illustrating the attachment of the baffle ends to the side panels and looking in the direction of the arrows 8—8 in FIGURE 6; and FIGURE 9 is an enlarged cross sectional fragmentary view showing the spacer and reinforcement indentations provided at the outer sides of the baffles looking in the direction of the arrows 9—9 in FIGURE 6.

With reference to FIGURES 1 and 2 which illustrate diagrammatically two of the many possible applications of the dust separator of the invention it will be seen that the separators are preferably used with a forced air current. The separators can be installed either upstream or downstream with respect to the blower as illustrated.

FIGURE 1 illustrates the downstream application of the dust separator, at the outlet of a blower 10 which draws in dirty air from the atmosphere through an intake conduit 12 and discharges it under pressure into the housing 14 of separator unit 15. Separator housing 14 contains a bank 16 of separator cells 18 preassembled as shown in FIGURE 3 and each constructed as illustrated in FIGURES 4-9. Depending on the requirements and the capacity of the blower 10, any number of cells 18 of differing size may be preassembled together to form a bank unit 16 of desired size and capacity.

The individual cells 18 are generally rectangular in cross-section as viewed from either end, and funnel shaped in the direction of the air stream, with the open larger end 20 providing the air inlet and the smaller open end 22 connected into a bleed-air and dust conveying tube 24. As shown in FIGURE 4 each cell 18 is relatively long and narrow, and the cells are parallel in the cell bank assembly.

The cells in the bank 16 have their inlet openings 20 lying in a common plane and they provide substantially unobstructed admission of air into the cell bank 16. Tubes 24 are parallel at right angles to initial air flow and all discharge into a common exhaust conduit diagrammatically indicated at 26 in FIGURES 1 and 2 from which the dirt and bleed-air is expelled to the atmosphere or collected as desired. One end of conduit 26 is usually closed as at 29. At the low pressure side of the separator of FIGURE 1 a clean air outlet 28 directs the cleaned air to its point of destination. Where the separator is used on a locomotive for example, one or both ends of conduit 26 may discharge directly into the atmosphere.

The dust separator cells 18 are provided with spaced baffles 30 through which the cleaned air passes into outlet 28 as will appear, while the remainder of the air passes into tubes 24 taking the extracted dust or dirt along with it.

In FIGURE 1, air to be cleaned indicated by the solid arrows enters air inlet channel 12 carrying dust or dirt particles 32 with it. The air is discharged under pressure by blower 10 into separator unit 15 where it enters cell bank 16, passing into the separate cells 18 through the larger end 20. Once in the separator cells most of the air (about 90%) is diverted from its initial course to flow through the space between the baffles 30 and out of the cells to enter outlet 28 as shown by the solid arrows. The large majority of the particles 32 do not follow the deviated course of the main portion of the air but are reflected or deflected from the sloping edges of baffles 30 to remain within the cells and are carried due to their own inertia by the remaining small amount of air (about 10% of the total air) into tubes 24. The direction of the dirt laden bleed air is indicated by dashed arrows and it is eventually removed by conduit 26.

Since the lateral cross-section of air flow passage through the bank 16 is substantially uniform between openings 20 and tubes 24, the cell bank 16 offers little resistance to total air flow.

Relatively clean air which exits from the cells 18 is blown into the outlet 28 to be available for its intended use.

Since the blower 10 in FIGURE 1 discharges into separator unit 15, the bleed air together with the dirt is continuously flushed from the conduit 26 by the forced air stream as shown by the dashed arrows and conveyed to a disposal point.

FIGURE 2 depicts an installation in which the dust separator unit 15 is positioned upstream, that is, in the intake of blower 10. Although the general functioning and direction of air flow through the unit 15 is the same as in FIGURE 1 a small auxiliary bleed blower (not shown) or, as illustrated, an aspirator 34 may be required which by means of compressed air from an air compressor 36 continuously exhausts the bleed air together with the dirt particles 32 from the exhaust conduit 26 to prevent accumulation of dirt and subsequent clogging which would impair the efficiency of the separator. The aspirator may be of any conventional design.

As shown in FIGURE 3 a desired number of cells 18 are assembled in parallel relation with their larger ends mounted in a frame 31 shaped to fit into the housing of unit 14. The tubes 24 have their closed ends attached to a plate 33 also adapted to be secured suitably to housing 14, and the other ends of tubes 24 open into an exhaust manifold 35 adapted to be attached to housing 14. Conduit 26 is connected into the manifold. Thus the cell bank 16 shown in FIGURE 3 can be preassembled and detachably inserted into housing 14. Eight cells 18 are shown in FIGURE 3 as compared to three in FIGURE 1, but any desired number may be employed. If desired the entire cell bank 16 of FIGURE 3 may be withdrawn from housing 14 merely by disconnecting the blower outlet and pulling the unit 16 out through the left end of the housing 14 in FIGURE 1.

Referring to FIGURES 4–9, each funnel shaped cell 18 comprises a bleed-off tube 24 which forms the supporting base of the cell and which may be cylindrical as shown or of any desired cross section. Attached to tube 24 as by welding are spaced flat identical parallel imperforate end plates 38 which are tapered with their smaller ends secured as by welding to tube 24. End plates 38 are spaced almost the effective length of tube 24 and interconnected at their edges by a number of elongated transverse V-shaped baffles 30 extending parallel to tube 24. These rows of baffles form oppositely inclined side walls of cell 16. The cell 16 is bridged at the larger end of the end plates 38 by a longitudinal rectangular cover plate 40 (FIGURE 3) attached to the end plates as by welding. Cover plate 40 is provided with inwardly turned flanges 41 defining a rectangular elongated aperture 42 (see FIGURE 3) which provides air inlet opening 20.

Between end plates 38, tube 24 is longitudinally slotted at 39 to receive the converging inner vanes 51 of the lowermost baffles 30a. The converging vanes 51 define bleed-air opening 72 to receive all of the air that does not pass out between baffles 30.

As shown in FIGURES 5 and 7, baffles 30 are each of essentially V-shaped configuration, being formed by bending a sheet metal strip into the required shape, and are all of substantially the same size. Baffles 30 are positioned in the cell 18 so that the open ends of the V are directed towards the tube 24 and the smaller end of the funnel, and the closed ends or apices 44 of the V are directed towards the large end of the funnel. Two angularly related rows 46 and 48 respectively of equally spaced baffles 30 are thus provided extending along the opposite edges of end plates 38 following the taper of the plates.

Each baffle 30 comprises an outer inclined vane 49 and an inner inclined vane 51, and each baffle in its row extends into partially nested relation with the adjacent baffle so that a V-shaped air passage 50 is provided between each adjacent baffle whereby air (see the solid lines in FIGURE 7) passes from the interior of each cell 16 through non-linear passage 50 outwardly of the cell. Since all vanes 49 are parallel to each other, as are all vanes 51, these passages are all of the same size. The inner legs 53 of passages 50 extend rearwardly at an acute angle to the main direction of air flow through the cell, and the outer legs 55 of passages 50 extend at acute angles to legs 53 and in the general direction of flow of air through cell 18. Thus outer vanes 49 directionally control clean air flow in the unit.

The outer vanes 49 of each baffle 30 are provided with a number of indentations 58, spaced along their length as shown in FIGURE 6. These indentations 58 form projections of predetermined depth. They provide a reinforcement and stiffening means extending between the outer vanes and at the same time they provide a spacing defining and maintaining means between the adjacent baffles by abutting against the next adjacent baffle as shown in FIGURES 5, 7 and 9.

With reference to FIGURES 6 and 8, the opposite ends of the inner vanes 51 of the baffles 30 are provided with projecting tongues 60 that extend through inclined spaced slots 62 in end plates 38. Slots 62 are punched or otherwise formed in the end plate at the desired predetermined angle and spacing for properly orienting the baffles in the cell assembly, and tongues 60 are peened over as at 64 outside the end plates as shown in FIGURE 8 to securely anchor and attach baffles 30 to the end plates 38.

The two lowermost baffles 30a in each cell do not have indentations 58 in their outer vanes but are instead permanently secured as by welding at 66 directly to tube 24. The converging inner vanes 51 of the lowermost baffles 30a, as shown in FIGURE 7, preferably extend partly into the longitudinal slot 39 of tube 24 which runs the entire length of the tube, and are connected therein in predetermined relation by a number of spaced binding clips 70. This predetermined spacing of the two converging inner baffle vanes provides an effective opening 72 into the tube 24 of such dimensions that approximately 10% of the total incoming air will be forced therethrough as bleed-air to carry off the concentrated dirt particles 32 therein into the tube 24 as indicated by the dashed arrows. The width of opening 72 affects the efficiency of particle removal from incoming air and is determined by the angularity of the inner baffle vanes and the angular position of the two rows of baffles in relation to the tube 24 and is maintained by the stiffness of the vanes and clips 70.

Referring to FIGURE 7, it has been found that for maximum efficiency and smooth air flow, the lateral dimension "X" of the inner portion of passage 50 between the inner baffle vanes 51 should preferably be slightly larger than the lateral dimension "Z" of the outer portion of passage 50 between outer vanes 49. As shown in FIGURE 7 the distance Z is indicated by the double arrow extending between the outer surface of lowermost vane 49 and the dotted line projection of the inner surface of the vane 49 next thereabove. Furthermore, it has been found that an angle of between 4° 30′ to 5° 30′ of the rows of baffles 46 and 48 relative to a plane bisecting the cell and tube 24 as indicated in FIGURE 5 provides maximum efficiency and smooth, laminar air flow in most constructions.

The invention thereby provides a novel separator cell structure and a novel cell bank assembly.

Each cell 18 is therefore effectively an elongated rectangular cross section funnel having closed ends 38, and oppositely inclined sides formed by V-shaped baffles 30 extending between the ends 38. At the smaller open discharge end, the funnel is rigidly attached to conduit 24 along the length of slot 39. At the larger end of the funnel receives air to be cleaned through aperture 42. The effective area of the funnel discharge opening at 72 is less than the area of aperture 42.

Each side of the cell 18 comprises a row of equally spaced similar and similarly disposed baffles 30 of V-shape arranged in partly nested overlap relation, so that a substantially V-shaped passage 50 is formed between each pair of adjacent baffles. Each baffle 30 is positioned within its row with its apex disposed toward the air inlet end of the funnel, so that the inclined inner baffle vanes 51 are in the direct path of air flow of the edges of the air stream and are impinged by the particles 32 in the air stream. By making the inner leg of this pasage 50 between inner baffle vanes 51 larger than the outer passage leg between outer baffle vanes 49, the velocity of air flow through the outer leg is increased and more uniform smooth flow is attained. The small restriction provided by indentations 58 aids in this action and improves efficiency of operation.

A desired plurality of cells 18 are combined in side by side relation as in FIGURE 3 to form the novel cell bank 16. All of the cover plates 40 lie essentially in a common plane within frame 31.

In operation the air to be cleaned enters apertures 42, either directly from the blower outlet as in FIGURE 1 or under the pull of the blower inlet as in FIGURE 2.

The air entering each cell 18 through its aperture 42 is thereby forced under pressure toward the smaller discharge area at 72 and pressure might be expected to build up within the cell. However, both sides of each cell provide air discharge outlets through passages 50 so that there is no appreciable pressure drop across the unit 15. The air stream entering aperture 42 is gradually converged toward discharge outlet 72, and the outer boundary layers of the stream directly impinge on the inner inclined vanes 51 before changing direction and entering passages 50. The solid particles 32 in these layers are deflected by vanes 51 away from passages 50 and inwardly toward the axis of the stream which carries them onward at a velocity which is greater than the velocity of the cleaned air moving through passages 50. Therefore the air discharged through passages 50 has been cleaned since the particles 32 tend to concentrate in the central flow axis of the stream in line with outlet 72.

It will be observed that the action of the individual cells is to gradually strip the outer boundary layers of the incoming air stream of the particles 32 whereby a progressive air cleaning action takes place as the stream converges.

The inertia of the particles reflected from vanes 51 is greater than the force exerted on them by the velocity of the changing direction air flowing through passages 50, so that the particles do not follow the air through passages 50.

Eventually the central portion of the air stream containing the bleed air now containing the concentration of particles 32 continuously discharges through outlet 72 into tubes 24 to be carried away as shown by the dashed arrows, and the cleaned air is available for use. All of the cells 18 act across the air stream, and the cell bank 16 thereby cleans the entire volume of incoming air.

In a cell construction wherein the apices of the baffles of the inclined rows lie in planes converging at an included angle of between 9° to 11° toward the tube 24, it has been found that about 90% of the air volume is cleaned and discharged through passage 50 while the remainder acts as bleed air in which the particles are concentrated and conveyed through discharge outlet 72.

The filter of the invention works efficiently in any position and handles large bodies of air with great efficiency regardless of the dirt load in the air to be cleaned. It is sturdy and automatically cleans itself of any separated material tending to remain within the cells or discharge conduits. The air is cleaned at high velocity with a minimum of pressure drop across the separator. There are no relatively moving mechanical parts and the smooth internal surfaces therein offer little resistance to passage of air and particles. The cells are preferably integrally united structures fabricated from corrosion resistant sheet metal contributing to very long life.

The present invention may be embodied in other forms without departing from the spirit and essential characteristics thereof, therefore, the present invention is to be considered in all respects as illustrative only and not restrictive, the scope of the invention being indicated by the appended claims rather than by the foregoing description.

What is claimed and desired to be secured by Letters Patent is:

1. Apparatus for removing dust and like solid particles from air and like gases comprising a housing, a plurality of similar funnel-shaped open ended cells mounted in side-by-side relation within the housing with the larger ends of said funnels open to receive air to be cleaned, a separate tubular exhaust conduit secured to the smaller end of each cell, each said conduit having a slotted side wall region coextensive with and enclosed by the open smaller end of the associated cell, means in the side walls of each of said cells extending into the outer portions of the air stream flowing through the cell for deflecting solid particles inwardly toward the medial portion of the stream and shaped for forming non-linear passages through said side walls for conducting the major part of the air passing therethrough into a cleaned air space defined within said housing around said cells, said deflecting means at the smaller outlet end of each said cell comprising opposed converging vanes defining at said slotted region a discharge opening of predetermined width, means securing said vanes to the associated conduit, and means interconnecting said converging vanes for thereby determining and maintaining said predetermined opening width, and a cleaned air outlet conduit connected to said housing space.

2. In the apparatus defined in claim 1, a frame mounting the larger ends of said cells within said housing, means for mounting said conduits within said housing, and an exhaust manifold connected to one end of all said conduits.

3. In the apparatus defined in claim 1, said cells each being of elongated rectangular cross section with oppositely inclined side walls composed of parallel V-shaped baffles arranged in nested relation to form V-shaped cleaned air passages through said side walls.

4. In the apparatus defined in claim 1, means defining an exhaust passage connected to said exhaust conduits, and means effective within said passage for increasing the velocity of exhaust discharge whereby the removed particles are flushed through said apparatus.

5. In the apparatus defined in claim 1, said vanes comprising the inner sides of downwardly open V-shaped side baffles in each cell, and the outer sides of said baffles being downwardly extending vanes rigidly secured to the associated conduit at each side of the slotted region.

6. Cell structure for removing dust and like particles from air and like gases comprising an elongated funnel having end walls and oppositely inclined side walls converging from an inlet opening for admitting air to be cleaned to a smaller outlet opening for discharging a minor part of the air containing a concentration of said particles, each of said side walls comprising a row substantially V-shaped baffles fixed at opposite ends to said end walls with the open mouth of the V-shape facing the outlet end of the funnel, each baffle comprising an apex and inclined inner and outer vanes, said baffles in each row being arranged in parallel spaced relation with the inner vane of each baffle extending into the air stream within the cell and the apex of each baffle being nested within the open mouth of the next baffle so that a series of substantially V-shaped air outlet passages are formed through said side walls, said inner vanes deflecting solid particles from the outer layers of the air stream into the inner part of the stream which carries them in concentration to the narrow outlet of the funnel, an exhaust conduit connected to said narrow outlet of the funnel, said conduit having a longitudinal slot, with the outer vanes of the end baffles at the outlet of the cell being secured to the conduit at opposite sides of the slot, and means interconnecting the inner vanes of said end baffles for defining a discharge opening of predetermined width into said slot.

7. In the cell structure defined in claim 6, means providing projections on said outer baffle vanes serving to maintain spacing between adjacent baffles and reenforce the assembly.

8. Cell structure for removing dust and like particles from air and like gases comprising an elongated funnel having end walls and oppositely inclined side walls converging from an inlet opening for admitting air to be cleaned to a smaller outlet opening for discharging a minor part of the air containing a concentration of said particles, each of said side walls comprising a row of substantially V-shaped baffles fixed at opposite ends to said end walls with the open mouth of the V-shape facing the narrow outlet end of the funnel, each of said baffles comprising an apex and inclined inner and outer vanes, said baffles in each row being arranged in parallel relation with the inner vane of each baffle extending into the air stream within the cell and the apex of each baffle nested within the open mouth of the next baffle so that adjacent pairs of parallel inner and outer vanes in each row define the legs of a series of substantially V-shaped air outlet passages are formed through said side walls, said inner vanes being spaced apart a greater distance than said outer vanes so that the inner passage leg is larger than the outer passage leg to promote smooth flow of cleaned air therethrough, and said inner vanes deflecting solid particles from the outer layers of the air stream into the inner part of the stream which carries them in concentration to the narrow outlet of the funnel, and a conduit connected to said narrow outlet of the funnel.

9. Cell structure for removing dust and like particles from air and like gases comprising an elongated funnel having parallel imperforate end walls and oppositely inclined side walls converging from an inlet opening for admittting air to be cleaned to a smaller outlet opening for discharging a minor part of the air containing a concentration of said particles, each of said side walls comprising a row of substantially V-shaped sheet metal baffles having tongues at opposite ends anchored in said end walls for angularly orienting said baffles in the assembly with the open mouth of the V-shape facing the narrow outlet end of the funnel, interlock means between said tongues and said end walls for anchoring said baffles, said baffles having inner and outer vanes diverging from an apex arranged in parallel relation with the inner vane of each baffle extending into the air stream within the cell and the apex of each baffle nested within the open mouth of the next baffle so that a series of substantially V-shaped air outlet passages are formed through said side walls, said inner vanes deflecting solid particles from the outer layers of the air stream into the inner part of the stream which carries them to concentration to the narrow outlet of the funnel, and a conduit connected to said narrow outlet of the funnel.

References Cited

UNITED STATES PATENTS

| | | | |
|---|---|---|---|
| 836,702 | 11/1906 | Ostendorff | 261—110 |
| 2,122,511 | 7/1938 | Bubar. | |
| 2,152,115 | 3/1939 | Van Tongeren. | |
| 2,182,862 | 12/1939 | Allardice. | |
| 2,712,858 | 7/1955 | Wintermute | 55—443 X |
| 2,876,862 | 3/1959 | Hummell | 55—444 |
| 3,050,160 | 8/1962 | Chesser | 29—513 X |
| 3,155,474 | 11/1964 | Sexton | 55—442 X |
| 3,237,386 | 3/1966 | Tarr et al. | 55—443 |

FOREIGN PATENTS

| | | |
|---|---|---|
| 607,963 | 1/1935 | Germany. |
| 1,094,769 | 12/1960 | Germany. |
| 417,811 | 10/1934 | Great Britain. |
| 699,670 | 11/1953 | Great Britain. |
| 135,886 | 3/1952 | Sweden. |

HARRY B. THORNTON, *Primary Examiner.*

S. SOKOLOFF, *Assistant Examiner.*